(12) United States Patent
Lund et al.

(10) Patent No.: US 8,327,142 B2
(45) Date of Patent: Dec. 4, 2012

(54) SYSTEM AND METHOD FOR FACILITATING SECURE ONLINE TRANSACTIONS

(75) Inventors: Craig Lund, Irvine, CA (US); Garret Grajek, Huntington Beach, CA (US); Stephen Moore, Portland, OR (US)

(73) Assignee: SecureAuth Corporation, Irvine, CA (US)

( * ) Notice: Subject to any disclaimer, the term of this patent is extended or adjusted under 35 U.S.C. 154(b) by 1070 days.

(21) Appl. No.: 11/702,371

(22) Filed: Feb. 5, 2007

(65) Prior Publication Data

US 2008/0077796 A1 Mar. 27, 2008

Related U.S. Application Data

(60) Provisional application No. 60/827,118, filed on Sep. 27, 2006.

(51) Int. Cl.
*H04L 29/06* (2006.01)
(52) U.S. Cl. .......................................... 713/169; 705/67
(58) Field of Classification Search .................. None
See application file for complete search history.

(56) References Cited

U.S. PATENT DOCUMENTS

| | | | |
|---|---|---|---|
| 4,868,877 A | 9/1989 | Fischer | |
| 5,881,226 A | 3/1999 | Veneklase | |
| 5,999,711 A | 12/1999 | Misra et al. | |
| 6,026,166 A | 2/2000 | LeBourgeois | |
| 6,035,406 A | 3/2000 | Moussa et al. | |
| 6,041,357 A * | 3/2000 | Kunzelman et al. | 709/228 |
| 6,128,738 A * | 10/2000 | Doyle et al. | 713/185 |
| 6,324,645 B1 | 11/2001 | Andrews et al. | |
| 7,120,929 B2 | 10/2006 | Beattie et al. | |
| 7,127,607 B1 | 10/2006 | Su et al. | |
| 7,131,009 B2 | 10/2006 | Scheidt et al. | |
| 7,140,036 B2 | 11/2006 | Bhagavatula et al. | |
| 7,143,286 B2 | 11/2006 | Brown et al. | |
| 7,185,364 B2 | 2/2007 | Knouse et al. | |
| 7,310,670 B1 * | 12/2007 | Walbeck et al. | 709/225 |
| 2002/0095570 A1 * | 7/2002 | Eldridge et al. | 713/155 |
| 2002/0166048 A1 * | 11/2002 | Coulier | 713/169 |
| 2003/0041136 A1 | 2/2003 | Cheline et al. | |
| 2003/0065920 A1 * | 4/2003 | Benantar et al. | 713/175 |
| 2003/0236985 A1 * | 12/2003 | Ruuth | 713/173 |
| 2004/0268148 A1 | 12/2004 | Karjala et al. | |
| 2005/0015448 A1 * | 1/2005 | Smith et al. | 709/206 |

(Continued)

OTHER PUBLICATIONS

Authentication in an Internet Banking Environment; Federal Financial Institutions Examination Council; 2001, 14 pages.

(Continued)

*Primary Examiner* — Gilberto Barron, Jr.
*Assistant Examiner* — David Le
(74) *Attorney, Agent, or Firm* — Knobbe, Martens, Olson & Bear, LLP

(57) ABSTRACT

A method and system for mutually authenticating a client and a server is provided in accordance with an aspect of the present invention. The method commences with transmitting a token from the server to the client. Thereafter, the method continues with establishing a secure data transfer link between the server and the client. A server certificate is transmitted to the client during the establishment of the secure data transfer link. The method continues with transmitting a response packet to the server, which is validated thereby upon receipt. The system includes a client authentication module that initiates the secure data transfer link and transmits the response packet, and a server authentication module that transmits the token and validates the response packet.

28 Claims, 11 Drawing Sheets

U.S. PATENT DOCUMENTS

| | | |
|---|---|---|
| 2005/0081026 A1 | 4/2005 | Thornton et al. |
| 2005/0120224 A1* | 6/2005 | Murakami .................... 713/182 |
| 2006/0015716 A1 | 1/2006 | Thornton et al. |
| 2006/0036850 A1* | 2/2006 | Enokida ....................... 713/156 |
| 2006/0294366 A1 | 12/2006 | Nadalin et al. |

OTHER PUBLICATIONS htp://www.articsoft.com/wp_pki_intro.htm Introducton to Public Key Infrastructure, printed Jan. 26, 2007, 6 pages.

Marchesini, et al., Keyjacking: The Surprising Insecurity of Client-side SSL, Dartmouth College, Feb. 13, 2004, 16 pages.

http://www.entrust.com/pki.htm What is a PKI?Dec. 8, 2006, 5 pages.

Gutmann, Peter, Everything you Never Wanted to Know about PKI but were Forced to Find Out, University of Aukland, presentation, Aug. 2002, 48 pages.

Housley, R., et al., Network Working Group, Internet X.509 Public Key Infrastructure Certificate and Certificate Revocation List (CRL) Profile, Apr. 2002, 108 pages.

Dierks, T. et al., Network Working Group, The Transport Layer Security (TLS) Protocol Version 1.1, Apr. 2006, 88 pages.

Myers, M. et al., Network Working Group, X.509 Internet Public Key Infrastructure Online Certificate Status Protocol—OCSP, Jun. 1999, 21 pages.

Kent, S., Network Working Group, Privacy Enhancement for Internet Electronic Mail: Part II: Certificate-Based Key Management, Feb. 1993, 29 pages.

International Search Report, PCT/US 08/08920, Jul. 23, 2008.

International Search Report, PCT/US 09/37770, Mar. 20, 2009.

* cited by examiner

SYSTEM AND METHOD FOR FACILITATING SECURE ONLINE TRANSACTIONS

CROSS-REFERENCE TO RELATED APPLICATIONS

This application relates to and claims the benefit of U.S. Provisional Application No. 60/827,118 filed Sep. 27, 2006 and entitled "MULTI-FACTOR AUTHENTICATION INCS PRODUCT SECUREAUTH IS A UNIQUE TECHNOLOGY TO AUTHENTICATE USERS TO ONLINE IT RESOURCES. SECUREAUTH IS UNIQUE IN ITS ABILITY TO UTILIZE X509 CERTIFICATES, IN A NON-PHISHABLE MANNER, TO AUTHENTICATE AND IDENTIFY USERS WITHOUT FORCING AN ENTERPRISE TO HOST A PKI INFRASTRUCTURE. SPECIFICALLY MFAS UNIQUE INTELLECTUAL PROPERTY PROVIDES X509 SECURE AUTHENTICATION WITHOUT REQUIRING THE ENTERPRISE TO DEPLOY CLIENT-SIDE SSL" which is wholly incorporated by reference herein.

STATEMENT RE: FEDERALLY SPONSORED RESEARCH/DEVELOPMENT

Not Applicable

BACKGROUND

1. Technical Field

The present invention generally relates to methods and systems for authentication in secure data communications. More particularly, the present invention relates to methods and systems for bi-directionally authenticating the client and the server using a plurality of factors including a public key infrastructure (PKI) certificate.

2. Related Art

Banking, financial services, government, education, and all varieties of companies rely upon advanced computer systems and data communication networks such as the Internet. While such advancements have greatly increased the speed and convenience with which business is conducted, numerous vulnerabilities compromise the security of the highly sensitive and confidential data being exchanged. At the most basic level, electronic transactions typically involve a server computer system and a client computer system communicating over a network. Additional client or server computer systems may also be connected to the network, such that multiple clients may access a given server, or multiple servers may be accessed by a given client. In this open network environment, the primary concern of data security is three-fold. First, the server must be assured that the client is what it asserts it is. Second, the client must be assured that the server is what it asserts it is. Third, any information being exchanged between a legitimate server and a legitimate client must not be intercepted or changed by any other computer systems on the network.

In the electronic banking setting, for example, the bank must authenticate the identity of the user accessing the banking server, so that transactions relating only to a particular customer are permitted, and that the user accessing the banking server is verified as the customer or someone given authority by the customer. The client must be ensured that the banking server is, indeed, the server operated by the bank, and not a similar one operated by a malicious entity. This is known as a phishing attack, where a fake server is made to resemble the legitimate server, and tricks the user into providing confidential information such as bank account numbers, social security numbers, passwords, and the like. Much harm may be inflicted on the customer by a criminal possessing such information, including erroneous accumulation of debt, arrest records, criminal convictions, destruction of creditworthiness, damage to reputation, and so forth. These are also known as identity theft crimes. As confidential information is being transmitted over an open network, such information must be encrypted or otherwise rendered incomprehensible to any other system besides the client and the server. The open nature of the network renders computer systems susceptible to replay attacks, where a valid data transmission is intercepted and repeated later for fraudulent or malicious purposes. For example, passwords or other authentication information may be intercepted, and used later to gain access to sensitive information. Further, the information being transmitted on the network must not be modifiable, such as in the case of man-in-the-middle attacks. This involves an attacker reading, inserting and modifying data between a legitimate client and server with neither recognizing the compromised nature of the link.

A variety of techniques is used to authenticate, or verify the identity of the client. Authentication may utilize one or more factors, which include something a user knows, something a user has, and something a user is. Most often, only a single factor is utilized because of the added cost and complexity of additional authentication factors. In such single-factor authentication systems, the most common is the use of a password or a personal identification number (PIN) to limit access. Another example is an ATM card with a corresponding PIN. The server maintains a list of usernames and corresponding passwords/PINs, and when the entered username and password/PIN combination is determined to be correct after a comparison to the list, access to the system is permitted. The secret nature of passwords and PINs, at least in theory, prevents unauthorized users from accessing the computer system. This technique is ineffective because the authorized users oftentimes mistakenly and unwittingly reveal their passwords or PINs to an unauthorized user. Furthermore, brute-force techniques involving the entry of every combination of letters, numbers, and symbols, as well as dictionary-based techniques, may further compromise the effectiveness of such authentication systems. Because passwords must be memorized, users often choose words that are easier to remember, making it more susceptible to defeat by means of dictionary attacks. On the other hand, the more complex the passwords are required to be, the more likely that the password will be written on something easily accessible, for both the legitimate and malicious user, in the vicinity of the computer. As asserted by the Federal Financial Institutions Examination Council (FFIEC), single factor authentication is a substantial weakness, particularly in financial or banking-related on-line services.

In addition to passwords, an additional factor may be utilized that involves something a user has. These include simple devices that are connected to the client computer through an external peripheral port, as well as sophisticated tokens that generate unique codes or one-time passwords (OTP) that are that are entered in conjunction with a username and a password as described above. Currently available token-based authentication systems include the RSA SecureID, which utilizes a time-synchronized OTP, and the Verisign Unified Authentication, which utilizes a mathematical algorithm-based OTP. While greatly increasing security, token devices are expensive to license, expensive to maintain, and cumbersome for the user to carry. As with any diminutive device, tokens are easy to lose. When lost, it may take days or weeks for a replacement, resulting in additional cost and lost productivity.

A third authentication factor utilizes unique biometric attributes of a person, such as fingerprints, retinal and facial patterns, voice characteristics, and handwriting patterns. Biometric authentication, however, requires the deployment of specialized hardware for acquiring such data including fingerprint and retina scanners, microphones, and the like. Furthermore, specialized databases and software are required for comparing the acquired data to existing user data, otherwise referred to as enrollment data. Thus, the cost of such deployment is prohibitive, and is for the most part limited to large organizations. Additionally, biometric readings may be inconsistent from one acquisition to the next, thereby resulting in false negatives. Though fingerprint identification is being increasingly used in portable computers to secure access to applications and data therein, the use of such devices to authenticate with other computer systems is uncommon because of the need to maintain an enrollment database.

To authenticate the server computer system, and to ensure that data transmissions are not intercepted, the Transport Layer Security (TLS) protocol is frequently utilized. TLS is a cryptographic protocol that provides data exchanges safe from eavesdropping, tampering, and forgery, and is often used for securing web browsing, e-mail, file transfers, and other such electronic transactions. More particularly, TLS operates on the protocol layers below application-layer protocols such as the HyperText Transfer Protocol (HTTP), File Transfer Protocol (FTP), Simple Mail Transfer Protocol (SMTP), but above the transport level protocols such as the Transmission Control Protocol (TCP) or the User Datagram Protocol (UDP). Various components of a public key infrastructure (PKI) conforming to the International Telecommunications Union-Telecommunications Standardization Sector (ITU-T) PKI standard X.509 are utilized in the TLS protocol.

Generally, public key encryption involves a unique public/private key pair held by both the recipient and the sender. The private key of the sender is retained solely by the sender, and the private key of the recipient is retained solely by the recipient. The public key of the sender is distributed and is held by the recipient, and the public key of the recipient is also distributed and held by the sender. When transmitting a message, the sender's private key and the recipient's public key is used to encrypt the message. The message is decrypted by the recipient using the recipient's private key and the sender's public key. The recipient need not have a unique public/private key pair, however, and instead may utilize a one-time cipher.

TLS is commonly implemented only on a server-side basis, however, and only the server is authenticated. For example, when establishing a secure HyperText Transfer Protocol (HTTP) connection from a client browser to a web server, the client browser retrieves a digital certificate associated with the web server. The certificate, which contains the public key, is used by the browser to authenticate the identity of the web server, and to encrypt a session key transmitted back to the web server for use in encrypting subsequent data. In order to ensure the legitimacy of the server certificate, it is signed by a Certification Authority (CA).

Though the implementation of client-side TLS establishes a bilateral trust between the server and the client and prevents identity theft and phishing attacks, there are a number of significant deficiencies. More particularly, it is necessary for the client to obtain or purchase a certificate properly signed by the CA. Thus, complications associated with certificate ownership are placed on the user. Additionally, implementing client authentication on the server is a cumbersome process, in that additional servers and maintenance is necessary. In addition to the other core functionality provided by the server, it must be configured to issue user certificates.

Accordingly, there is a need in the art for a method and system for authenticating the client and the server without the use of hardware devices such as tokens or the deployment of client-side TLS. There is also a need for such authentication to be over multiple factors. Furthermore, there is a need for an improved method and system for initiating an encrypted data communications session using authentication credentials. There is also a need in the art for an authentication system that is easy to configure and readily integrates with existing servers and clients.

BRIEF SUMMARY

According to an aspect of the present invention, there is provided a method for mutually authenticating a client and a server. The method may begin with transmitting a token from the server to the client. Additionally, the method may include establishing a secure data transfer link between the server and the client. A server certificate may be transmitted to the client during the establishment of the secure data transfer link. The method may continue with transmitting a response packet to the server, which may include a full requested Uniform Resource Locator (URL) identifier, a client certificate, the server certificate, and the token. Additionally, the response packet may include an authenticity identifier signed with a private key. The method may also include validating contents of the response packet.

Since the authentication is conducted separately from the secure data transfer link, there is no need to convert websites for client-side authentication. Additionally, no user action is required to store or retrieve the client certificate, greatly simplifying certificate management on the client without compromising security.

According to another aspect of the present invention, the method may continue with validating the response packet may involve validating the full requested URL identifier in the response packet against a URL associated with the server. Further, validating the response packet may also involve validating the token in the response packet against a token stored on the server. The token in the response packet and the token stored on the server may contain a unique code. The method of validating the response packet may also involve validating a first copy of the server certificate stored on the server against a second copy of the server certificate in the response packet. Additional validation may include validating the client certificate against a client signature on the response packet. The client signature may be associated with the private client key. These validations ensure that the communication between the client and the server is secure, and not susceptible to man-in-the-middle and/or replay attacks, where tampering with the contents of the response packet may occur. Where any of the foregoing validations fails, the connection is deemed to have been compromised, and no further transmissions will occur.

The client certificate may be issued from a certificate server associated with an authorized certification authority, and the client may be linked to an organization associated with the server. Prior to issuing the client certificate, the method for mutually authenticating a client and a server may include validating the client with a challenge-response sequence. A response to the challenge-response sequence may be transmitted to a predetermined telephone device associated with a user, or may be transmitted to a predetermined e-mail address associated with the user. As such, there is no need for an organization to issue, manage, and track revocations of certificates. Along these lines, there is no need for an organization to install and configure the server for client-side authentication.

According to another aspect of the present invention, a system for bi-directionally authenticating a client and a server is provided. The system may include a server authentication module associated with the server. The server authentication module may include a memory for storing a server certificate and a token. Furthermore, the server authentication module may be operative to transmit the token and the server certificate to the client. In yet another aspect of the present invention there is provided a client authentication module associated with the client. The client authentication module may include a memory for storing a client certificate, the token, a full requested URL identifier, and the server certificate, and may be operative to transmit an authentication packet including the server certificate, the token, and the full requested URL identifier. The authentication packet may be signed with the client certificate.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
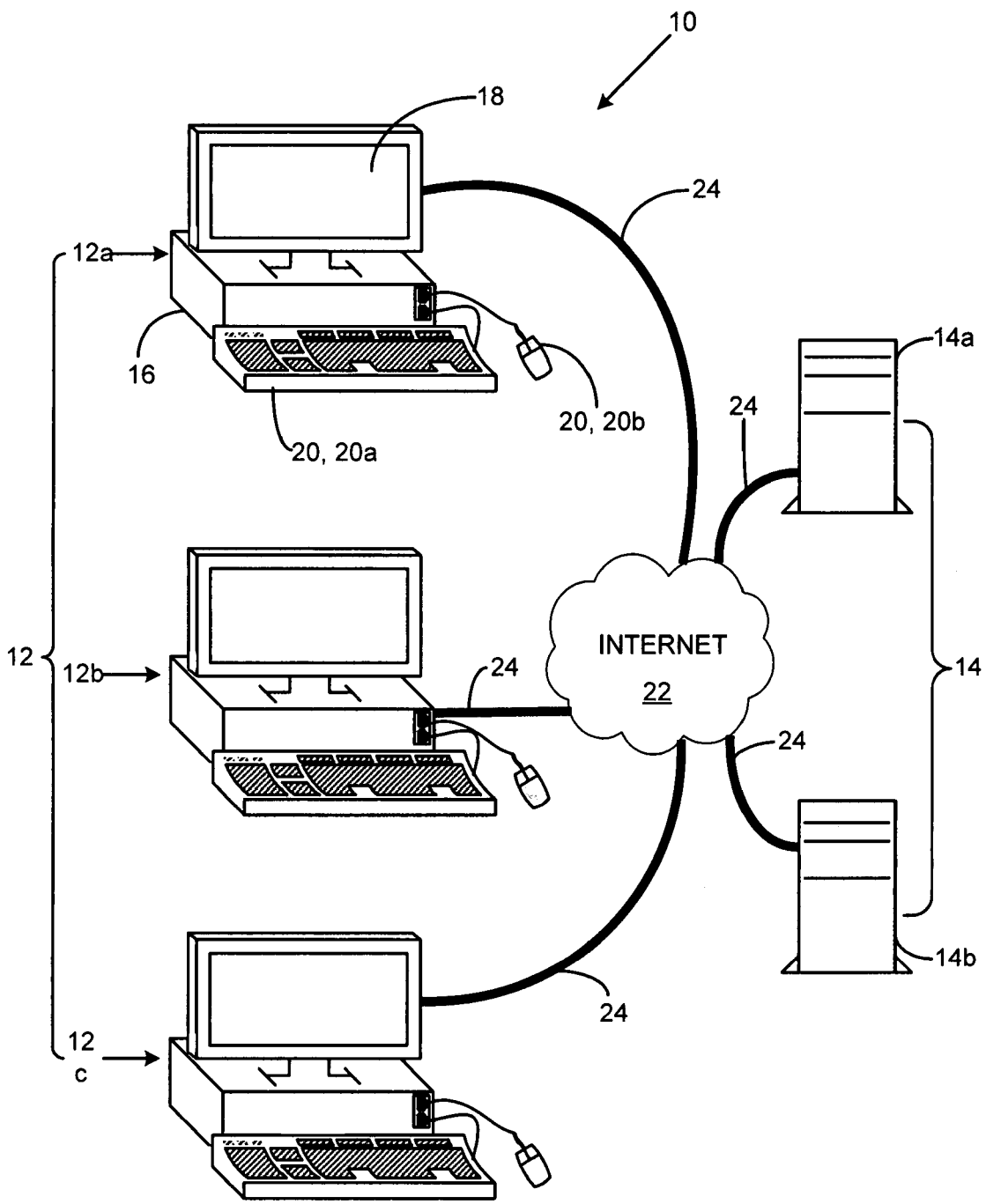
FIG. 1 is a block diagram illustrating an environment in which one aspect of the present invention may be implemented, including various interconnected servers and clients.

With reference to FIG. 1, an exemplary computer network 10 includes various data processing apparatuses or computers 12, 14. More particularly, the computers 12 may be personal computers or workstations that function as clients, and include a system unit 16 that houses a central processing unit, storage devices, and the like. The computers 12 may also include a display unit 18, and input devices 20 such as a keyboard 20a and a mouse 20b. It is understood that the system unit 16 receives various inputs from the input devices 20 that alter the control and flow of preprogrammed instructions being executed by the central processing unit, and the results of such execution are shown on the display unit 18. The computers 14 may be servers that provide data or services to the client computers 12. In this regard, the term "client" is understood to refer to the role of the computers 12 as a requester of data or services, while the term "server" is understood to refer to the role of the servers 14 to provide such data or services. Additionally, it is possible that the computers 12 may request data or services in one transaction and provide data or services in a transaction, thus changing its role from client to server or vice versa.

The computers 12, 14 are connected to a wide area network such as the Internet 22 via network connections 24. Requests from the client computers 12 and requested data from the server computers 14 are delivered through the network connections 24. According to an embodiment of the present invention, the server computers 14 are web servers, and the client computers 12 include web browsing applications such as Microsoft Internet Explorer that visually renders documents provided by the server computers 14 on the display unit 18. It will be appreciated that the network topology shown in FIG. 1 is presented by way of example only and not of limitation, and any other type of local or wide area network may be readily substituted without departing from the scope of the present invention. It is understood that any well known data transmission protocol may be utilized for the network connections 24 and the internet 22.

As a further example, a first server computer 14a may be an electronic banking web server that provides account information and funds transfer functionality. Additional uses are also contemplated, where the first server computer 14a hosts a mail server, an online shopping site, or a Microsoft .NET application. A user on the first client computer 12a may log on to first server computer 14a to retrieve the account balance and transfer funds to a separate account using a web browser. In this exemplary context, one of the considerations of information security includes ensuring that the user on the first client computer 12a is who he asserts to be. For example, a malicious user on a second client computer 12b may have all of the credentials of the user on the first client computer 12a to log on to the first server computer 14a without recognizing that such access is fraudulent. Another consideration is ensuring that the first server computer 14a is under the control of a bank of which the user on the first client computer 12a is a customer. It may be possible that the second server computer 14b is masquerading as the first server computer 14a in a phishing attempt, and the first client computer 12a may have been misdirected to the second server computer 14b. Additionally, all legitimate data transfers between the first client computer 12a and the first server computer 14a must not be intercepted by any of the other computers, including a third client computer 12c, the second client computer 12b, and the second server computer 14b.

Figure 2:
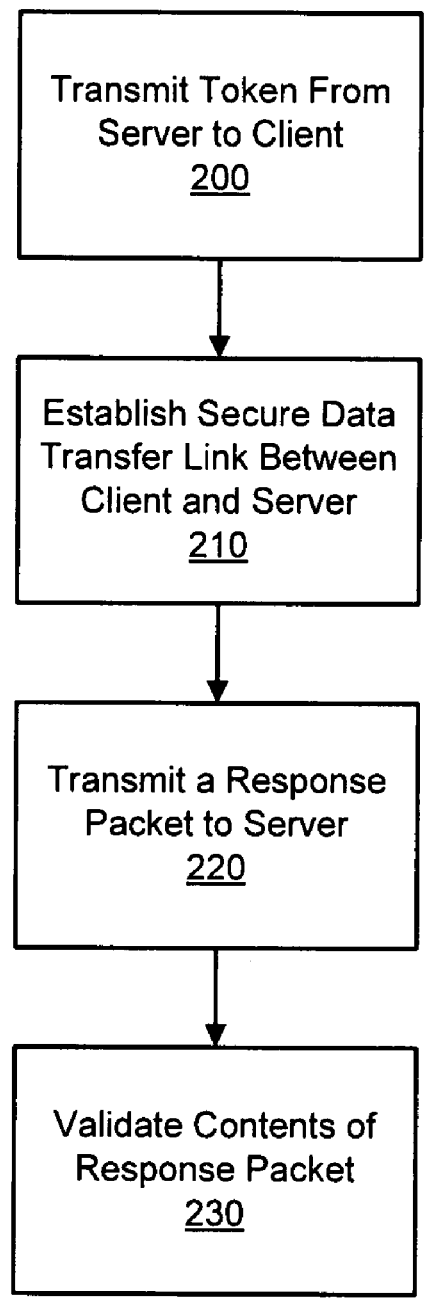
FIG. 2 is a flowchart illustrating a method for bi-directionally authenticating a client and a server in accordance with an aspect of the present invention.
Figure 3:
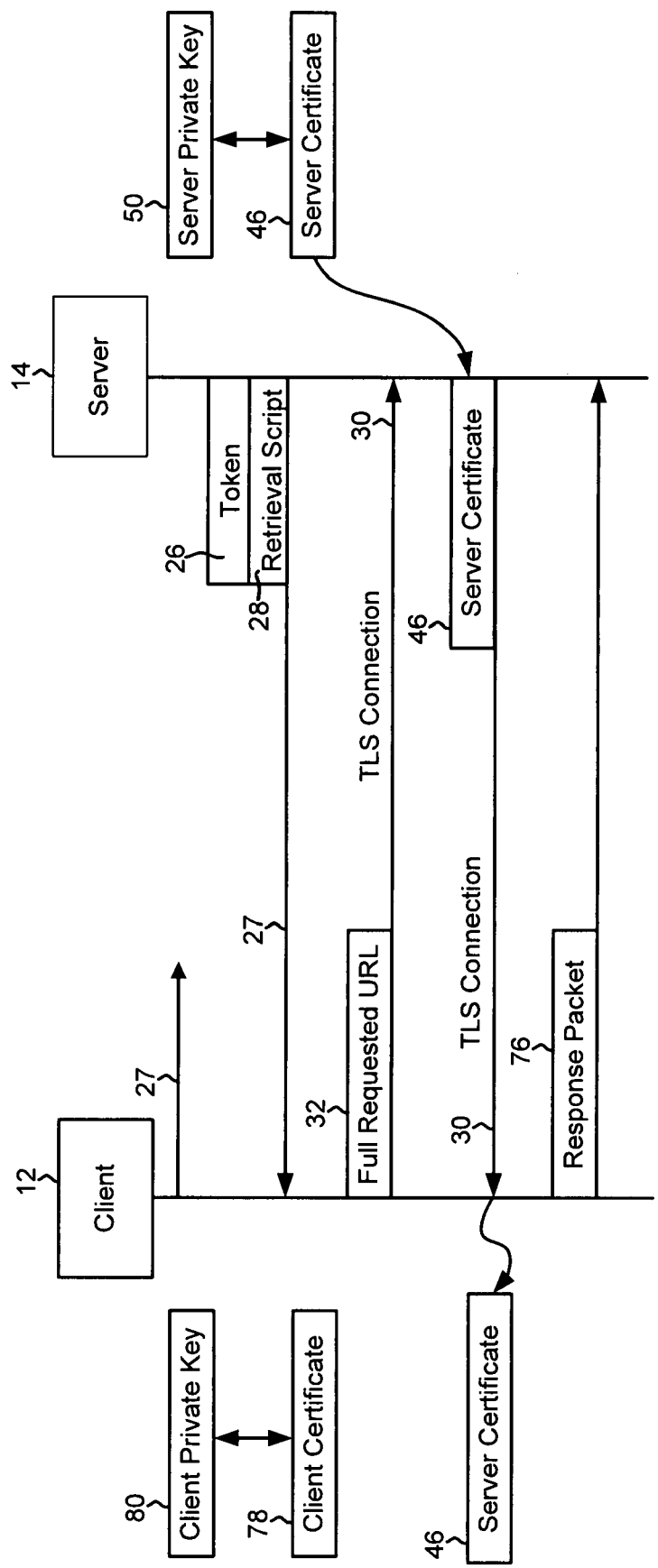
FIG. 3 is a sequence diagram illustrating the exchange of data for authenticating the client and the server.

An aspect of the present invention relates to a method of mutually authenticating the client computer 12 and the server computer 14. With reference to the flowchart of FIG. 2 and additionally to the sequence diagram of FIG. 3, the method initiates with a step 200 of transmitting a token 26 from the client computer 12 to the server computer 14 over an unsecured data link 27. However, prior to the transmission of the token 26, there may be an additional step of the client computer 12 initiating the unsecured connection 27 with the server computer 14. For example, the user may input the network address of the server computer 14 into the browser application on the client computer 12, at which point a request is made for a file or page on the server computer 14. The token 26 is also referred to as a certificate request identifier, and contains a random value that identifies the particular request. As will be described in further detail below, the token 26 is maintained on the server computer 14 to ensure that only transactions referenced by the certificate request identifier are deemed valid. It is understood that the random value prevents replay attacks. According to one embodiment of the present invention, the token 26 is accompanied by a certificate retrieval script 28, which directs the browser to begin the process of authenticating the client computer 12.

Figure 4:
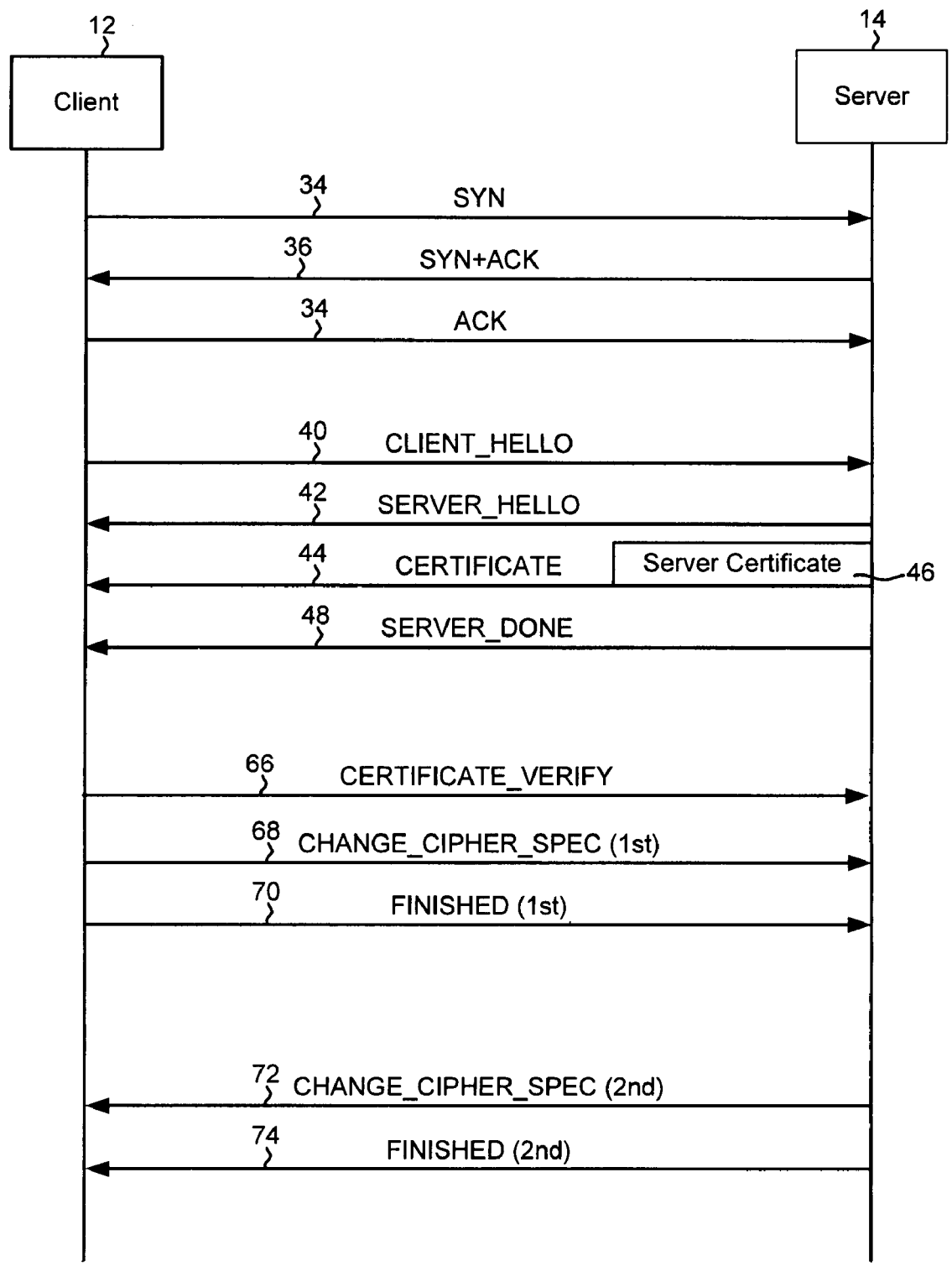
FIG. 4 is a sequence diagram illustrating the establishment of a Transport Layer Security (TLS) connection between the client and the server.

Thereafter, according to step 210, a secure data transfer link 30 is initiated by the client computer 12 utilizing a full requested Uniform Resource Locator (URL) 32. In accordance with a preferred embodiment, the secure data transfer link 30 is a symmetric TLS link. In further detail with reference to the sequence diagram of FIG. 4, the client computer 12 initiates a connection to the server computer 14 by transmitting a synchronize, or SYN packet 34. Thereafter, the server computer 14 transmits a synchronize and acknowledge, or SYN+ACK packet 36 to the client computer 12. Upon receipt, the client computer 12 re-sends an acknowledge, or ACK packet 38 to the server computer 14. As understood, the foregoing transmissions relate to the Transmission Control Protocol (TCP), a protocol layer underneath the TLS protocol.

Upon establishing a TCP connection between the client computer 12 and the server computer 14, a CLIENT_HELLO command 40 is sent from the client computer 12 to the server computer 14. This packet includes the highest version of TLS supported by the client computer 12, the ciphers and data compression methods supported by the client computer 12, a session identifier, and random data. Upon receipt of the CLIENT_HELLO command 40, the server computer 14 transmits a SERVER_HELLO command 42. The SERVER_HELLO command 42 includes the version of TLS, cipher, and data compression method that has been selected. Additionally, the previously set session identifier is included, as well as additional random data. Thereafter, the server computer 14 transmits the CERTIFICATE command 44, which includes a server certificate 46, and a SERVER_DONE command 48, which indicates that the server computer 14 has completed this handshaking phase.

The server certificate 46 is understood to be in conformance with the X.509 standard. More particularly, with reference to FIG. 5, the data stored in the server certificate 46 includes a version number 51, a serial number 52, an issuer identifier 54, a validity identifier 55, a subject public key information 57 including a public key algorithm identifier 57a and a subject public key 57b, and a certificate signature 59. The version number 51 identifies the version of the X.509 standard being used for the particular certificate, while the serial number 52 is a unique number assigned by a particular CA. The issuer identifier 54 includes the name of the CA that issued the certificate, and a validity identifier 55 includes a validity date range with earlier and later limits. The subject identifier 56 contains the name of a person, group, or organization to which the certificate was issued. The subject public key algorithm identifier 57a denotes the algorithm used to generate the subject public key 57b, and the subject public key 57b contains the public key associated with the certificate. The certificate signature 59 contains a signature as generated by the CA. As further understood, the server certificate 46 includes a corresponding server private key 50.

After verifying the authenticity of the sever certificate 46, the client computer 12 transmits a CERTIFICATE_VERIFY command 66. Additionally, the client computer 12 transmits a first CHANGE_CIPHER SPEC command 68, followed immediately by a first FINISHED command 70. This indicates that the contents of subsequent TLS record data sent by the client computer 12 during the current session will be encrypted. It is understood that the first FINISHED command 70 includes a digest of all handshake commands previously transmitted to ensure that no alteration occurred. Next, the server computer 14 transmits a second CHANGE_CIPHER_SPEC command 72, followed immediately by a second FINISHED command 74. Like the first CHANGE_CIPHER_SPEC command 68, the second CHANGE_CIPHER SPEC command 72 indicates that subsequent TLS record data sent by the server computer 14 during the current session will be encrypted. The second FINISHED command 74 includes all prior handshake commands from the server computer 14 to the client computer 12. The client computer 12 transmits a generated symmetric key that is encrypted with the subject public key 57b in the server certificate 46. The server private key 50 is used to decrypt to the symmetric key upon receipt by the server computer 14, and subsequent transmissions to the client computer 12 will be encrypted therewith.

As indicated above, the client computer 12 securely retrieves the server certificate 46 in accordance with an aspect of the present invention. Specifically, according to the process of establishing the TLS connection 30 between the client computer 12 and the server computer 14, the server certificate 46 is transmitted. In one embodiment, the client computer 12 stores the server certificate 46 for use outside the context of the TLS connection 30, as will be detailed further below.

Figure 5:
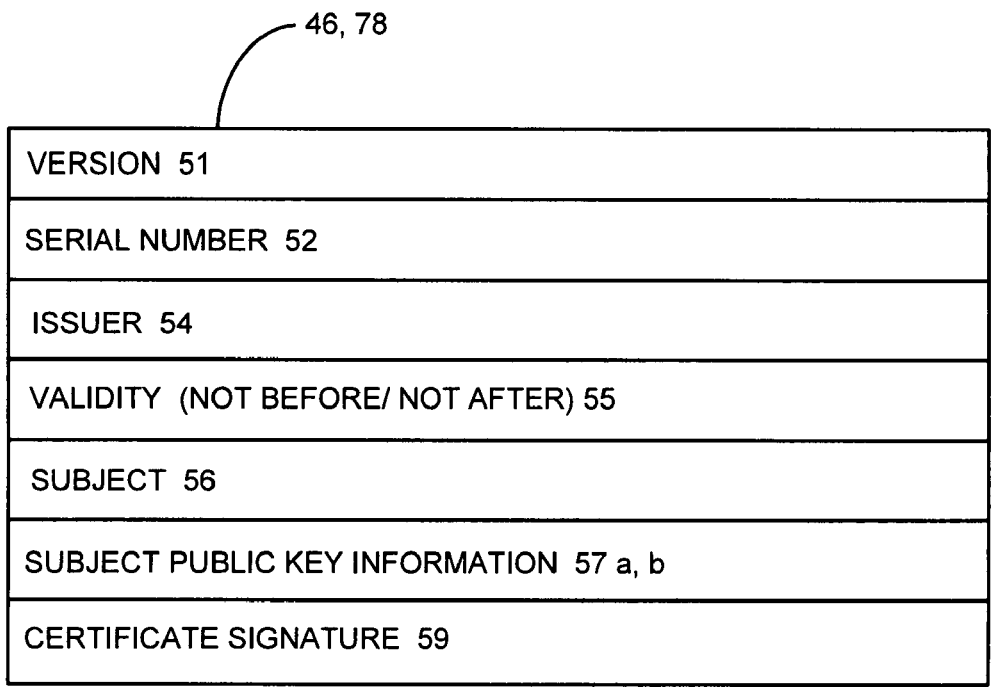
FIG. 5 is one embodiment of a digital certificate in accordance with an aspect of the present invention including various subparts thereof.
Figure 6:
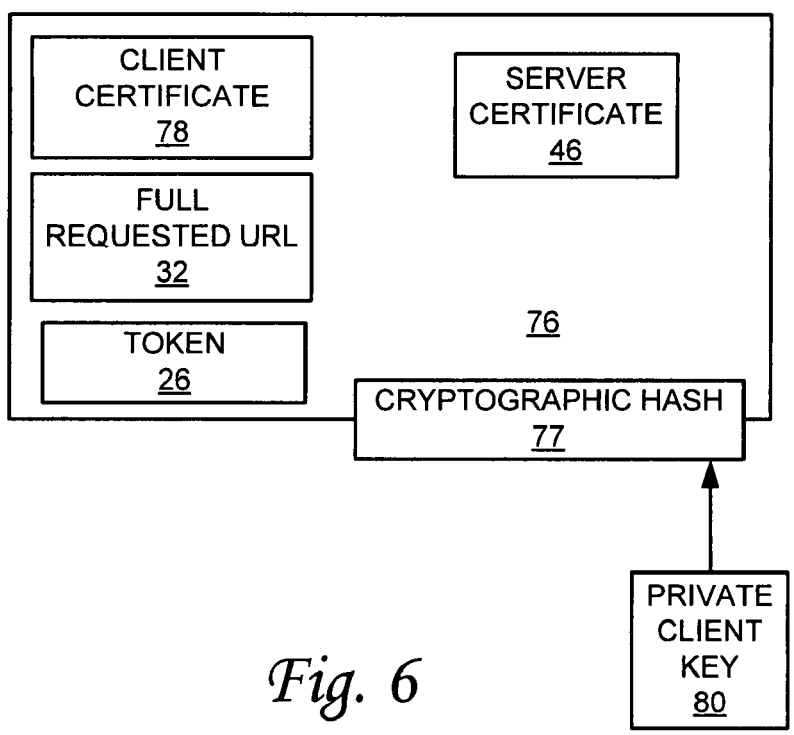
FIG. 6 is one embodiment of a response packet including a user certificate, a full requested URL, a token, and a server certificate.

Referring back to FIGS. 2 and 3, the method for mutually authenticating the client computer 12 and the server computer 14 continues with a step 220 of transmitting a response packet 76 to the server computer 14. In further detail as shown in FIG. 6, the response packet 76 is comprised of the full requested URL 32, the token 36, the server certificate 46, and a client certificate 78. The structure of the client certificate 78 is identical to that of the server certificate 46, and as shown in FIG. 5, includes the version 51, the serial number 52, the issuer 54, the validity identifier 55, the subject identifier 56, the subject public key information 57a,b, and the certificate signature 59. According to one embodiment of the present invention, the Microsoft CryptoAPI libraries are utilized to retrieve the client certificate 78 from a certificate storage location. Like the server certificate 46, the client certificate 78 also has a corresponding private key, a client private key 80. The response packet 76 includes an additional authentication identifier correlated to the private client key 80. According to one embodiment of the present invention, such authentication identifier is a cryptographic hash 77 of the contents of the response packet 76. By way of example only and not of limitation, the Message Digest Algorithm-2 (MD2) hash function is used, though any other hash function such as Message Digest Algorithm-5 (MD5), Secure Hash Algorithm (SHA) or the like may be substituted without departing from the scope of the present invention. The resulting cryptographic hash 77 is signed with the private client key 80

Figure 7A:
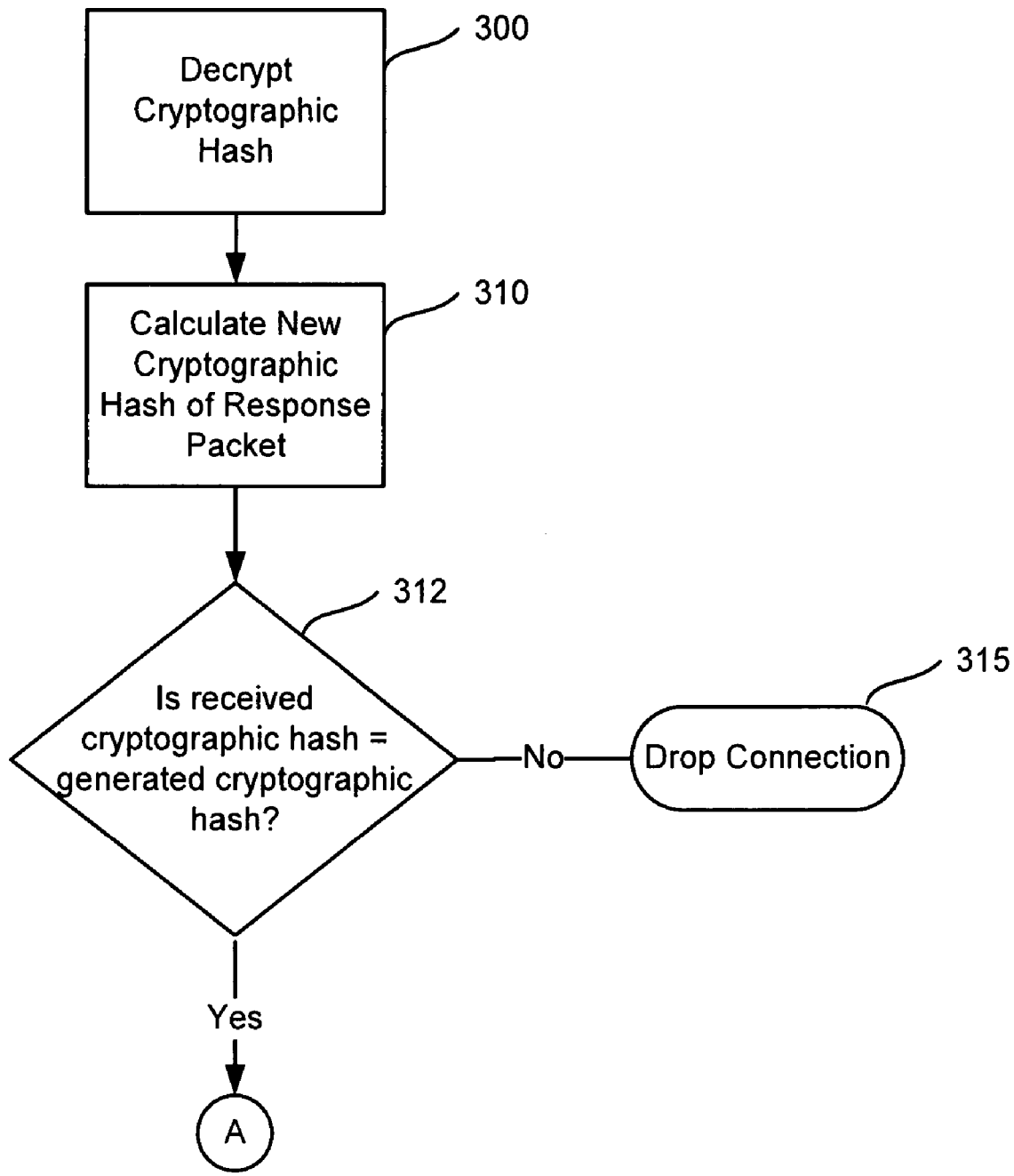
FIGS. 7a-c is a flowchart illustrating the verification of the response packet.
Figure 7B:
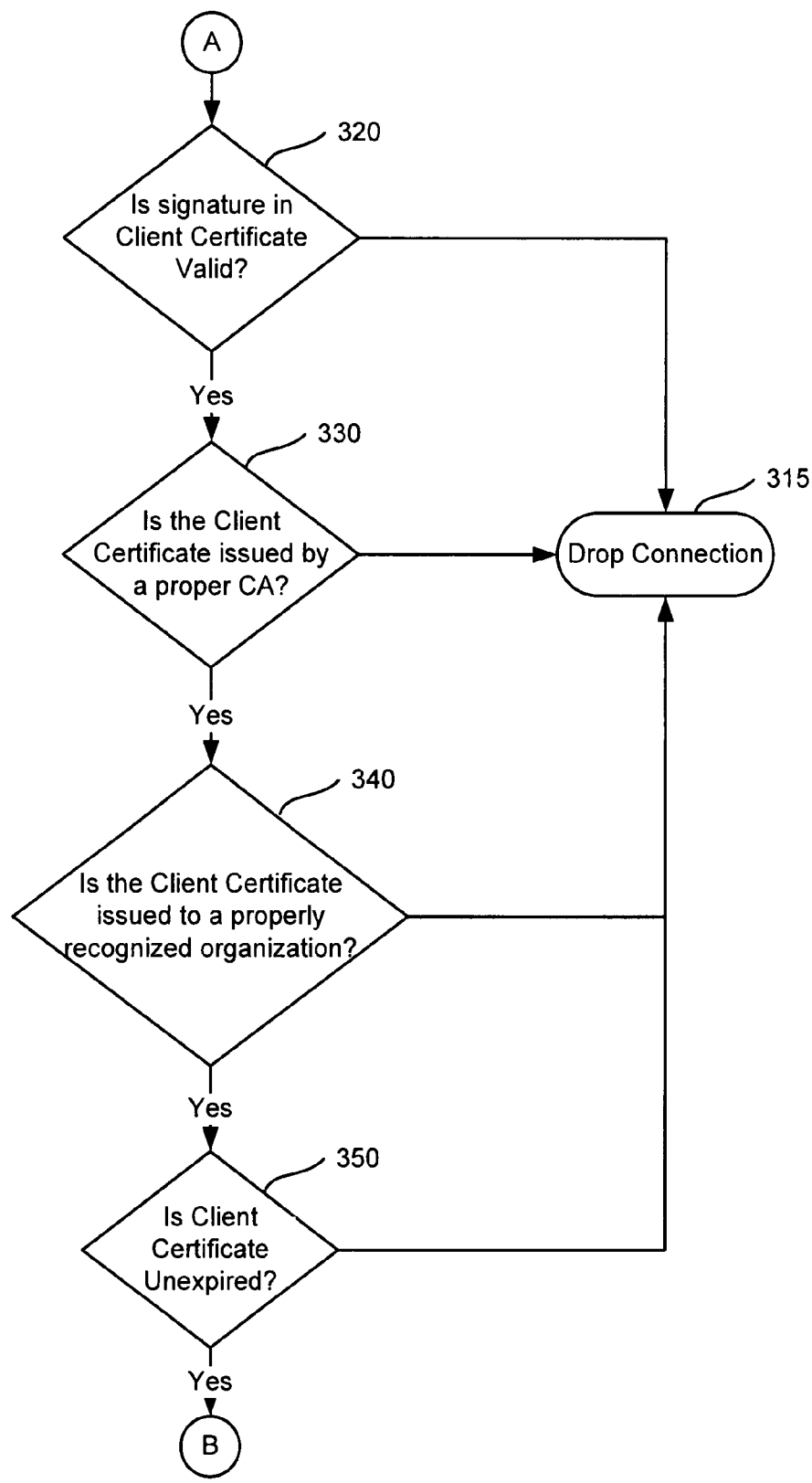
Figure 7C:
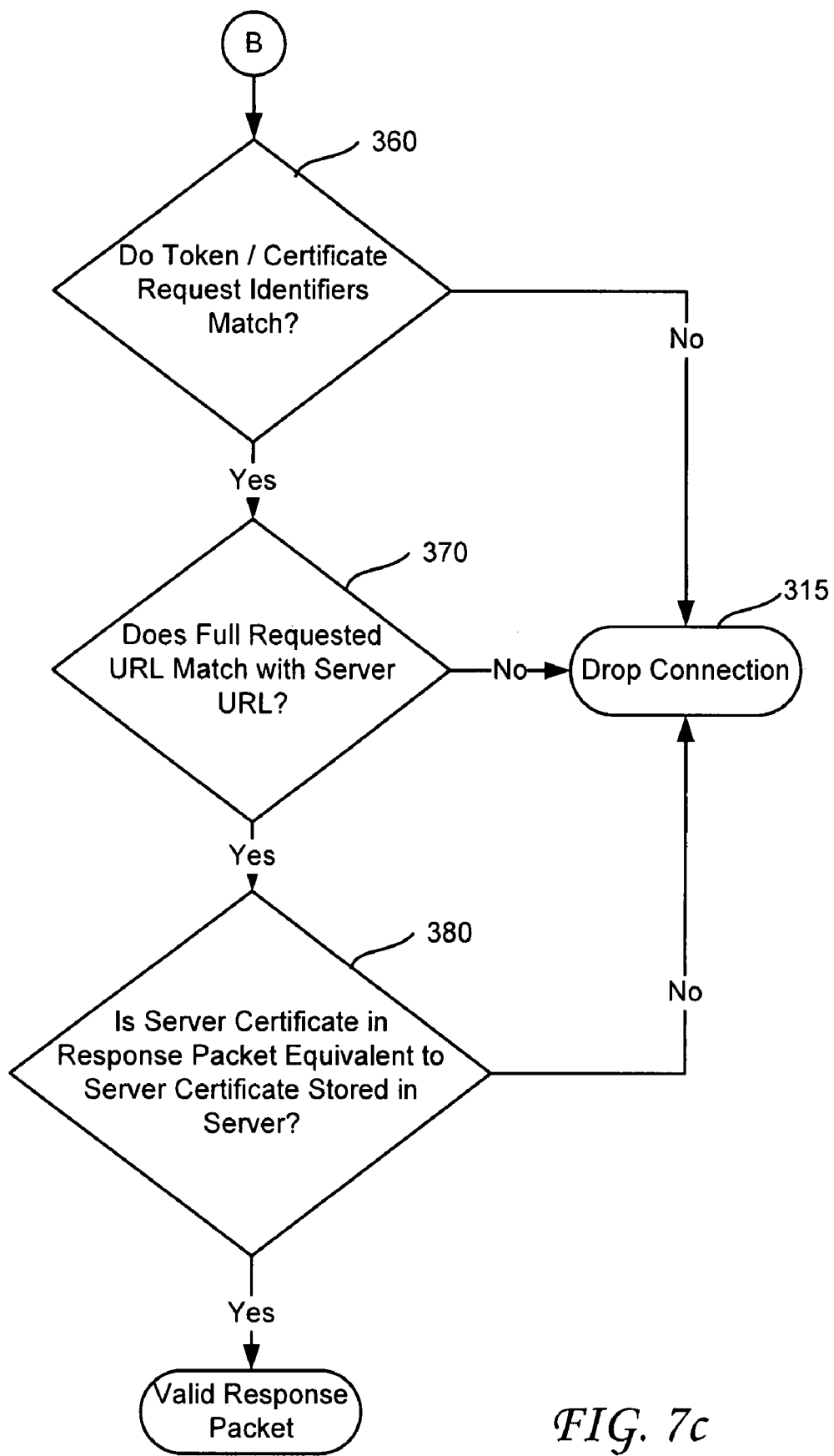

According to step 230, the method further includes validating the contents of the response packet 76. First, the authenticity of the response packet 76 itself is verified. As indicated above, the response packet 76 includes the cryptographic hash 77 that has been signed with the private client key 80. With reference to the flowchart of FIGS. 7a-7c, according to step 300, the client-side cryptographic hash 77a is decrypted using the client certificate 78. A server-side cryptographic hash is computed for the response packet 76 as existing on the server 14. The server-side cryptographic hash is compared against the client-side cryptographic hash 77 accompanying the response packet 76 per comparison step 312. If the values do not match, then the response packet 76 is deemed to have been tampered with, and any connections are terminated as in step 315. If the values match, further verification of the contents of the response packet 76 continues as will be described below.

Such further verification includes comparing the constituent parts of the response packet 76 with known copies thereof. First, the signature of the client certificate 78 is validated per step 320, where the subject public key information 57b is verified. Thereafter, the certificate signature 59 and the issuer identifier 54 are examined to confirm that a properly recognized CA has signed the client certificate 78 per step 330. The subject identifier 56 is also examined to confirm that the client certificate 78 was issued to a properly recognized organization according to step 340. According to one embodiment, a properly recognized organization refers to a legitimate organization having control over the server computer 14. Additionally, the client certificate 78 is confirmed to be valid and unexpired by comparing the validity identifier 55 of the client certificate 78 against the current date per step 350. If any of the foregoing validation step fails, the client certificate 78 is deemed to have been tampered with, and drops the connection per step 315.

The remaining components in the response packet 76 is also verified, including the full requested URL 32, the token 26, and the server certificate 46. As described above, the token 26, or the certificate request identifier is stored in the server computer 14. Per step 360, such stored value of the token 26 is compared against value of the token 26 in the response packet 76. It is understood that matching values confirms that no replay attacks are taking place. With respect to the full requested URL 32 in step 370 the value thereof is verified against the actual URL of the server computer 14. This is understood to verify that no phishing attacks are taking place that redirect the client computer 12 to a malicious server. With respect to the server certificate 46 included in the response packet 76, per step 380 it is compared against the server certificate 46 residing on the server computer 14. This prevents man-in-the-middle attacks, as a different server certificate 46 from the one stored on the server computer 14 as opposed to the one being returned via the response packet 76. Along these lines, if any of the foregoing verifications fails, the connection between the server computer 14 and the client computer 12 is immediately broken, and no further access to the server computer 14 is permitted. If there are no anomalies, however, the client computer 12 is authenticated and continues to access the server computer 14. As will be appreciated, the foregoing verifications discover one or more security breaches.

Figure 8:
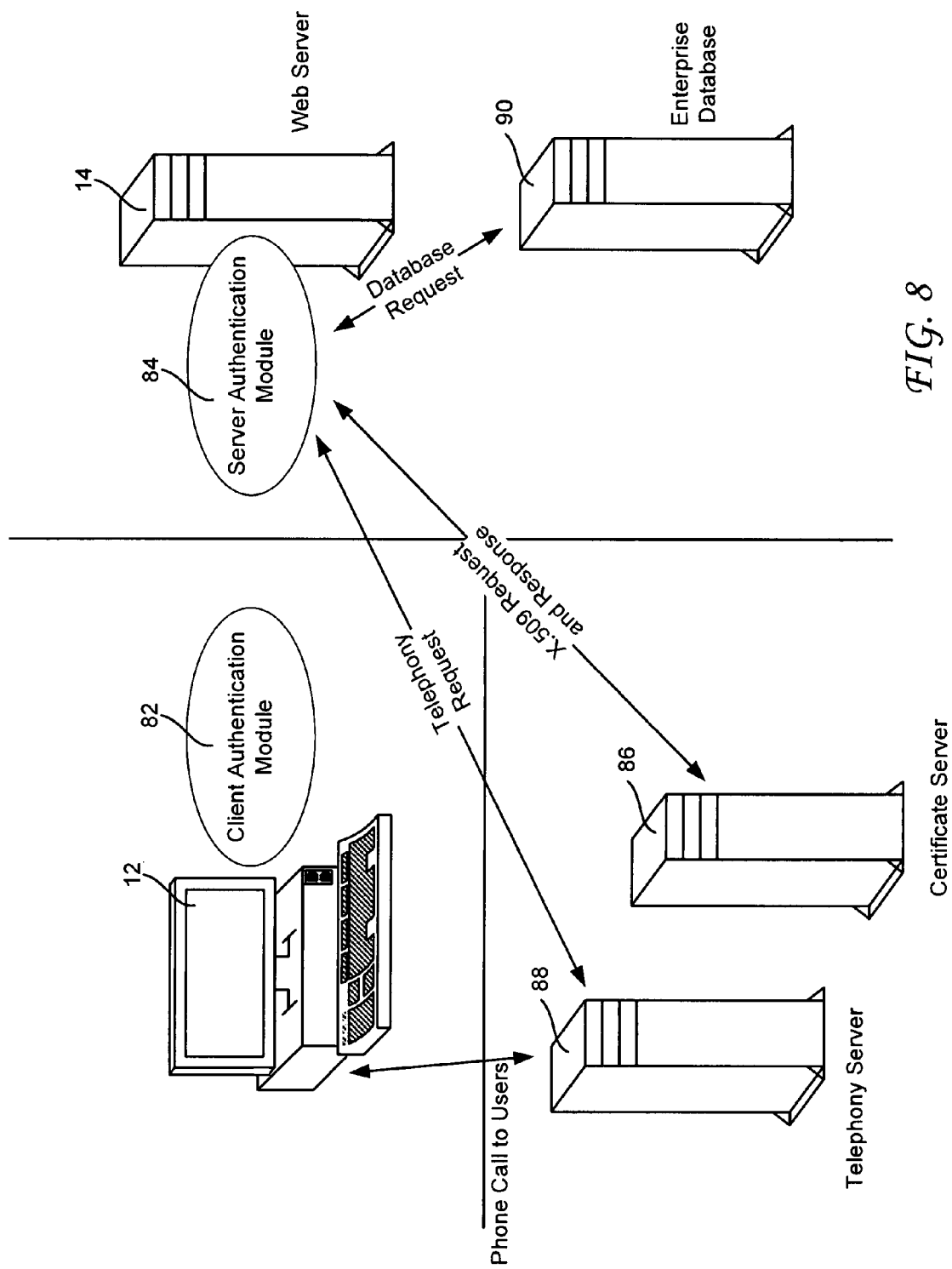
FIG. 8 is a first exemplary configuration of the mutually authenticating client and server where the certificate and telephony servers are controlled by a third party provider.

With reference to FIG. 8, according to another aspect of the present invention, the client computer 12 includes a client authentication module 82, and the server computer 14 includes a server authentication module 84. The client authentication module 82 is understood to handle the processes on the client side as discussed above, including retrieval of the token 26, the script 28, the server certificate 46, and the client certificate 78, as well as the transmitting of the response packet 76 after signing the same with the private client key 80. According to one embodiment, the client authentication module 82 is an Active-X component that is installed with a single user interaction via the web browser on the client computer 12. However, alternative executable components that may be added on to the browser are also deemed to be within the scope of the present invention. The server authentication module 84 is understood to handle the processes on the server side as discussed above, including transmission of the token 26 and the server certificate 46, as well as the validation of the received response packet 76. Thus, the client authentication module 82 and the server authentication module 84 communicate with each other, and together implement an X.509 authentication scheme without the deployment of client-side TLS.

It will be appreciated that the aforementioned method presupposes that a client certificate 78 and a corresponding private client key 80 already exist on the client computer 12. The server authentication module 84 may determine whether or not the client certificate 78 exists on the client computer 12, and if not, the server authentication module 84 alerts a certificate server 86. Prior to issuing a client certificate and a private client key to the client computer 12, the user associated therewith is authenticated via an out-of-band modality. According to one embodiment, the server authentication module 84 notifies a telephony server 88 to deliver a one-time password to a cellular phone or a landline phone under the control of the user. Alternatively, an e-mail or a Short Message Service (SMS) text message may be sent. Other out-of-band authentication techniques are contemplated, such as voice recognition, IP address verification, and the like. The entry of the one-time password may be handled through the server computer 14 with the server authentication module 84. In lieu of, or in addition to the foregoing out-of-band authentication, the user may be presented with an additional knowledge-based authentication. For example, the user may be asked about their favorite color, the high school they attended, and other similar questions.

Upon supplying the correct response, the server authentication module 84 directs the certificate server 86 to generate a private client key and a corresponding client certificate, and store it on the client computer 12. The additional authentication information may be stored in an enterprise database 90 for later retrieval and use by the server authentication module 84. It is understood that the foregoing procedure "registers" the browser on the client computer system 12 with the server computer 14, effectively making such browser a second authentication factor ("Something the user has").

Figure 9:
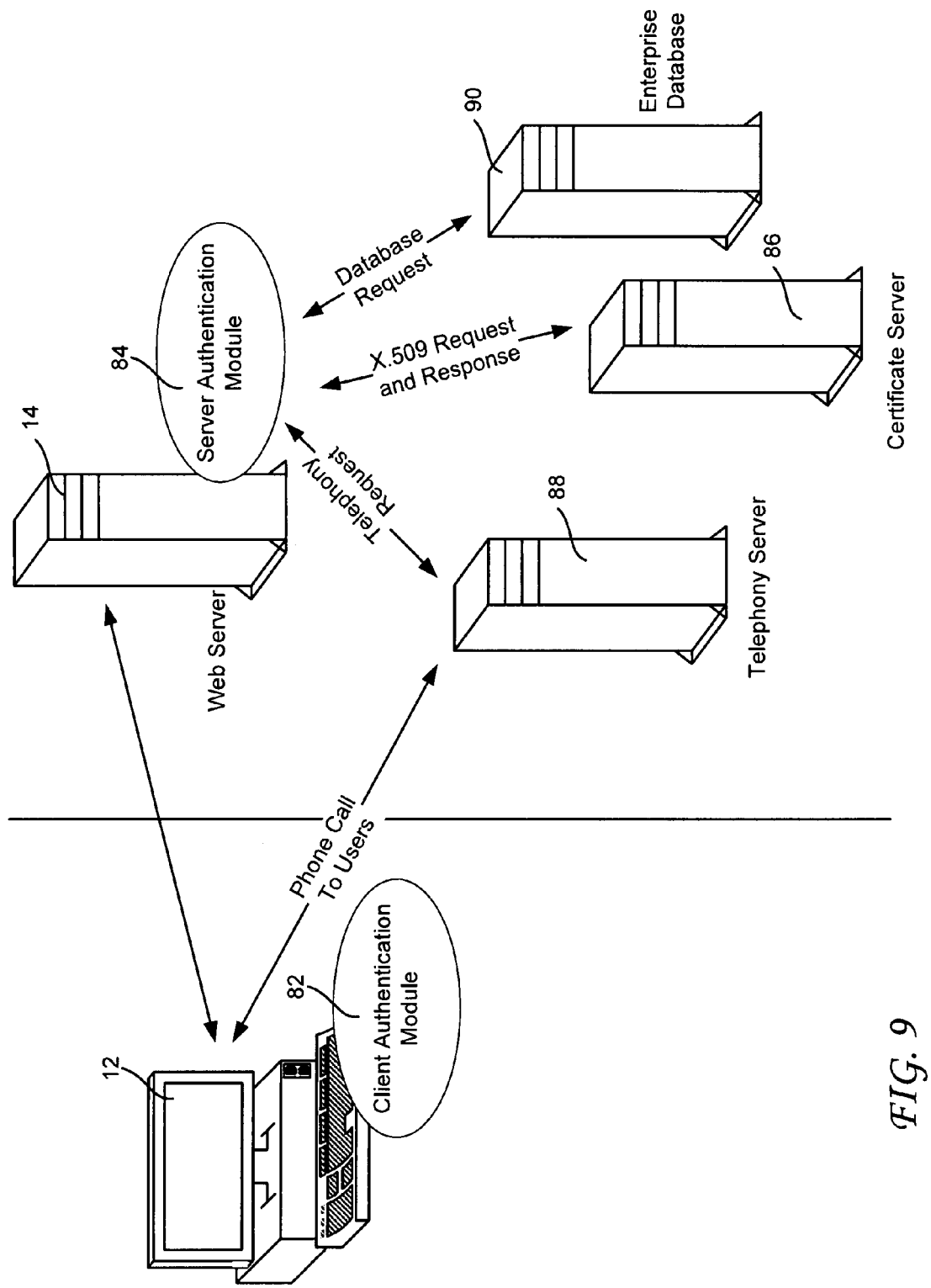
FIG. 9 is a second exemplary configuration of the mutually authenticating client and server in which the certificate and telephony servers are controlled by an organization controlling the server.
Figure 10:
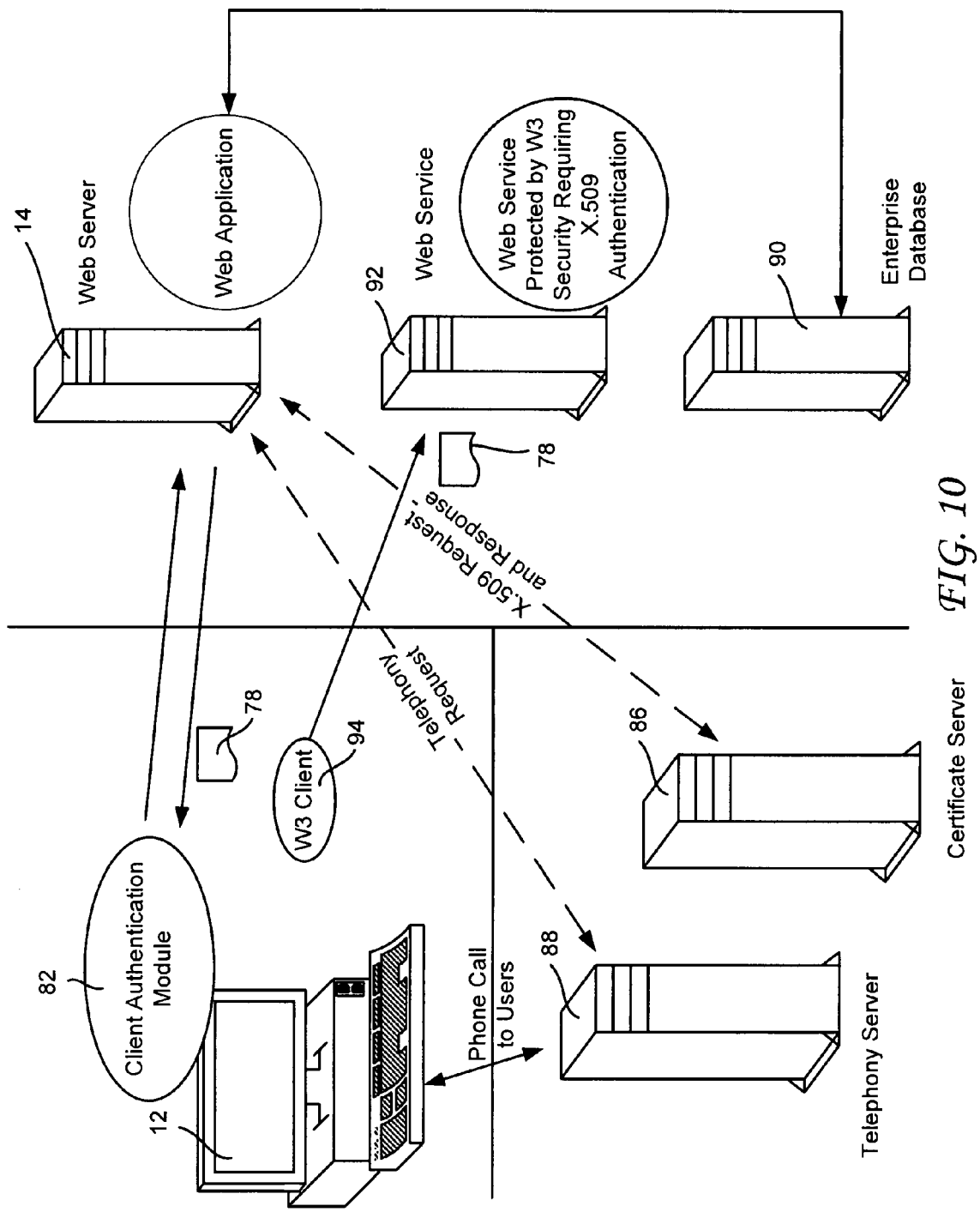
FIG. 10 is a third configuration of the mutually authenticating client and server where secure access to web services is provided.

As indicated above, the issuer identifier 54 is examined to confirm that a properly recognized CA has issued and signed the client certificate 78. According to the embodiment shown in FIG. 8, the certificate server 86 is the CA, and is understood to be within the control of a legitimate third party provider separate from the organization managing the server computer 14 and the enterprise database 90. In an alternative configuration shown in FIG. 9, the certificate server 86 and the telephony server 88 are managed and maintained by the same organization managing the server computer 14. In yet another configuration shown in FIG. 10, secure access is being enabled for web services 92. As understood, the term web service 92 refers to a standardized system for supporting machine to machine interaction. In this case, the client computer 12 utilizes the client authentication module 82 to authenticate with the server computer 14. The client certificate 78 thus generated is utilized to authenticate a W3 client to authenticate with the web service 92 via the client certificate 78.

In addition to the foregoing configurations, it is expressly contemplated that the client authentication module 82 and the server authentication module 84 may be integrated into a wide variety of applications requiring bi-directional authentication. By way of example only and not of limitation, these include .NET forms authentication in .NET applications, Microsoft Outlook Web Access, and Microsoft Sharepoint, as well as any other system with enforcement points that require proper client and server authentication.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. A method for mutually authenticating a client and a server, the method comprising:
    transmitting over a first data link a token including a unique session identifier generated by the server and signed with a private server key associated with a server certificate from the server to the client;
    initiating a secure data transfer link from the client to the server in response to receiving the token, the secure data transfer link being independent of the first data link;
    completing the secure data transfer link, the server certificate and a full requested Uniform Resource Locator (URL) identifier of the server as initially specified by the client being transmitted to the client during the completing of the secure data transfer link;
    transmitting to the server over the secure data transfer link, a response packet including the full requested URL identifier of the server transmitted to the client during the completing of the secure data transfer link, a client certificate, the server certificate as received from the server during the completing of the secure data transfer link, the token, and an authenticity identifier corresponding to a private client key, the private client key being associated with the client certificate; and
    validating the response packet.

2. The method of claim 1, wherein the authenticity identifier is a cryptographic hash of the response packet, the authenticity identifier being signed with the private client key.

3. The method of claim 1, wherein validating the response packet further includes validating the full requested URL identifier in the response packet against a URL associated with the server.

4. The method of claim 1, wherein validating the response packet further includes validating the token in the response packet against a token stored on the server.

5. The method of claim 2, wherein validating the response packet further includes validating a first copy of the server certificate stored in the server against a second copy of the server certificate in the response packet.

6. The method of claim 1, wherein validating the response packet further includes validating the client certificate against a client signature on the response packet, the client signature being associated with the private client key.

7. The method of claim 6, wherein the client certificate is unexpired.

8. The method of claim 6, wherein the client certificate is issued to an organization associated with the server.

9. The method of claim 1, wherein:
    the client certificate is issued from a certificate server associated with an authorized certification authority; and
    the client certificate is linked to an organization associated with the server.

10. The method of claim 8, wherein prior to issuing the client certificate, the method further includes validating the client with a challenge-response sequence.

11. The method of claim 10, wherein a response to the challenge-response sequence is transmitted to a predetermined telephone device associated with a user.

12. The method of claim 10, wherein a response to the challenge-response sequence is transmitted to a predetermined e-mail address associated with a user.

13. A method for authenticating a client to a server, the method comprising:
    receiving a token from the server over a first data link, the token including a unique session identifier generated by the server and signed with a private server key associated with a server certificate;
    initiating a secure data transfer link from the client to the server in response to receiving the token;
    receiving, from the server, the server certificate and a full requested Uniform Resource Locator (URL) identifier of the server as initially specified by the client, during completion of the secure data transfer link; and
    transmitting to the server over the secure data transfer link a response packet including the full requested URL identifier of the server received from the server by the client during the completion of the secure data transfer link, a client certificate, the server certificate as received from the server during completion of the secure data transfer link, the token, and an authenticity identifier corresponding to a private client key, the private client key being associated with the client certificate.

14. The method of claim 13, wherein the authenticity identifier is a cryptographic hash of the response packet, the authenticity identifier being signed with the private client key.

15. The method of claim 13, wherein:
    the client certificate is issued from a certificate server associated with an authorized certification authority; and
    the client certificate is linked to an organization associated with the server.

16. The method of claim 13, wherein prior to issuing the client certificate, the method further includes validating the client with a challenge-response sequence.

17. The method of claim 16, wherein a response to the challenge-response sequence is transmitted to a predetermined telephone device associated with a user.

18. The method of claim 16, wherein a response to the challenge-response sequence is transmitted to a predetermined e-mail address associated with a user.

19. A method for authenticating a server to a client, the method comprising:

transmitting a token from the server to the client over a first data link, the token including a unique session identifier generated by the server and signed with a private server key associated with a server certificate;

completing a secure data transfer link between the server and the client based upon a request therefor from the client, the server certificate and a full requested Uniform Resource Locator (URL) identifier of the server as specified by the client in the request being transmitted to the client during the completing of the secure data transfer link; and transmitting to the server a response packet including the full requested URL identifier of the server transmitted to the client during the completing of the secure data transfer link, a client certificate, the server certificate as transmitted to the client during the completing of the secure data transfer link, the token, and an authenticity identifier corresponding to a private, client key, the private client key being associated with the client certificate.

20. The method of claim 19, wherein the authenticity identifier is a cryptographic hash of the response packet, the authenticity identifier being signed with the private client key.

21. The method of claim 19, wherein validating the response packet further includes validating the full requested URL identifier in the response packet against a URL associated with the server.

22. The method of claim 19, wherein validating the response packet further includes validating the token in the response packet against a token stored on the server.

23. The method of claim 19, wherein validating the response packet further includes validating a first copy of the server certificate stored on the server against a second copy of the server certificate stored in the response packet.

24. The method of claim 19, wherein validating the response packet further includes validating the client certificate against a client signature on the response packet, the client signature being associated with the private client key.

25. The method of claim 24, wherein the client certificate is unexpired.

26. The method of claim 24, wherein the client certificate is issued to an organization associated with the server.

27. The method of claim 19, wherein the client certificate is issued from a certificate server associated with an authorized certification authority.

28. An article of manufacture comprising a non-transitory program storage medium readable by a computer, the medium tangibly embodying one or more programs of instructions executable by the computer to perform a method for mutually authenticating a client and a server, the method comprising:

transmitting over a first data link a token including a unique session identifier generated by the server and signed with a private server key associated with a server certificate from the server to the client;

initiating a secure data transfer link from the client to the server in response to receiving the token, the secure data transfer link being independent of the first data link;

completing the secure data transfer link, the server certificate and a full requested Uniform Resource Locator (URL) identifier of the server as specified by the client being transmitted to the client during the completing of the secure data transfer link;

transmitting to the server over the secure data transfer link, a response packet including the full requested URL identifier of the server transmitted to the client during the completing of the secure data transfer link, a client certificate, the server certificate as received from the server during the completing of the secure data transfer link, the token, and an authenticity identifier corresponding to a private client key, the private client key being associated with the client certificate; and validating the response packet.

* * * * *

UNITED STATES PATENT AND TRADEMARK OFFICE
CERTIFICATE OF CORRECTION

PATENT NO. : 8,327,142 B2
APPLICATION NO. : 11/702371
DATED : December 4, 2012
INVENTOR(S) : Craig Lund et al.

Page 1 of 1

It is certified that error appears in the above-identified patent and that said Letters Patent is hereby corrected as shown below:

In the Claims:

In column 13 at line 18, Claim 19, Change "private," to --private--.

Signed and Sealed this
Twentieth Day of August, 2013

Teresa Stanek Rea
*Acting Director of the United States Patent and Trademark Office*